(12) United States Patent
Agnesi et al.

(10) Patent No.: US 12,494,613 B2
(45) Date of Patent: Dec. 9, 2025

(54) DEVICE FOR THE COMPRESSION OF LASER PULSES OF THE ORDER OF THE NANOSECOND AND CONSEQUENT GENERATION OF ULTRASHORT PULSES OF THE ORDER OF ONE HUNDRED FEMTOSECONDS

(71) Applicant: BRIGHT SOLUTIONS S.R.L., Cura Carpignano (IT)

(72) Inventors: Antoniangelo Agnesi, Cura Carpignano (IT); Luca Carra', Cura Carpignano (IT); Giuliano Piccinno, Cura Carpignano (IT); Federico Pirzio, Cura Carpignano (IT)

(73) Assignee: BRIGHT SOLUTIONS S.R.L., Cura Carpignano (IT)

( * ) Notice: Subject to any disclaimer, the term of this patent is extended or adjusted under 35 U.S.C. 154(b) by 534 days.

(21) Appl. No.: 18/150,079

(22) Filed: Jan. 4, 2023

(65) Prior Publication Data

US 2023/0223730 A1 Jul. 13, 2023

(30) Foreign Application Priority Data

Jan. 7, 2022 (IT) .................. 102022000000167

(51) Int. Cl.
*H01S 3/00* (2006.01)
*G02F 1/35* (2006.01)
(Continued)

(52) U.S. Cl.
CPC .......... *H01S 3/0057* (2013.01); *G02F 1/3536* (2013.01); *G02F 1/365* (2013.01);
(Continued)

(58) Field of Classification Search
CPC ...... H01S 3/0057; H01S 3/0085; H01S 3/067; H01S 3/0912; H01S 3/094015;
(Continued)

(56) References Cited

U.S. PATENT DOCUMENTS 9,891,500 B1* 2/2018 Chu .................. H01S 3/067
2004/0240037 A1 12/2004 Harter
(Continued)

OTHER PUBLICATIONS

Liu, Zhanwei et al., Megawatt peak power from a Mamyshev oscillator, Optica, vol. 4, No. 6, Jun. 13, 2017 (7 pages).
(Continued)

*Primary Examiner* — Xinning(Tom) Niu
(74) *Attorney, Agent, or Firm* — KLINTWORTH & ROZENBLAT LLP

(57) ABSTRACT

A device for the generation of ultrashort pulses, wherein an oscillator is formed by: a first and a second non-overlapping transmission band-pass filter, which can serve as reflecting end element of the oscillator; optically transparent means with non-linear Kerr coefficient $\chi^{(3)}$ different from zero configured to achieve a spectral broadening by self-phase modulation of the signal transiting through these means; an optical waveguide that produces a positive gain; a node configured to receive a trigger signal designed to activate the operation of the oscillator; a trigger signal generating device comprising: a laser source, for example a microchip, configured to generate a laser pulse, preferably with a minimum bandwidth, having a duration of hundreds of ps, up to the ns; a coupling system designed to introduce the pulse of the trigger laser into a waveguide made of an optically transparent material characterised by a non-linear Kerr coefficient $\chi^{(3)}$ different from zero, which is configured to produce two distinct effects in order to spectrally broaden the pulse of the trigger laser, and precisely: a) self-phase modulation four-wave mixing; the output of the waveguide supplies the
(Continued)

trigger signal to the node. The pulses produced by the oscillator typically have a duration of the order of the picosecond and are easily reduced to the Fourier limit of circa 100 femtoseconds by means of a dispersive device.

15 Claims, 2 Drawing Sheets

(51) Int. Cl.
| | |
|---|---|
| *G02F 1/365* | (2006.01) |
| *H01S 3/067* | (2006.01) |
| *H01S 3/091* | (2006.01) |
| *H01S 3/094* | (2006.01) |
| *H01S 3/0941* | (2006.01) |
| *H01S 3/108* | (2006.01) |
| *H01S 5/00* | (2006.01) |
| *H01S 3/1123* | (2023.01) |

(52) U.S. Cl.
CPC ............ *H01S 3/0085* (2013.01); *H01S 3/067* (2013.01); *H01S 3/0912* (2013.01); *H01S 3/094015* (2013.01); *H01S 3/0941* (2013.01); *H01S 3/108* (2013.01); *H01S 5/0092* (2013.01); *H01S 3/1123* (2023.01)

(58) Field of Classification Search
CPC ...... H01S 3/0941; H01S 3/108; H01S 5/0092; H01S 3/1123; H01S 3/08027; H01S 3/10092; H01S 3/0627; H01S 3/0809; H01S 3/1112; H01S 3/0675; H01S 3/06791; H01S 3/113; H01S 3/08004; G02F 1/3536; G02F 1/365
See application file for complete search history.

(56) References Cited

U.S. PATENT DOCUMENTS

| | | | |
|---|---|---|---|
| 2012/0275474 A1* | 11/2012 | Aguergaray | H01S 3/1112 372/18 |
| 2013/0271765 A1* | 10/2013 | Couderc | G02F 1/365 356/402 |
| 2014/0030234 A1* | 1/2014 | Kim | A61K 38/13 435/6.12 |
| 2017/0207597 A1* | 7/2017 | Regelskis | H01S 3/106 |

OTHER PUBLICATIONS

Italian Search Report and Written Opinion issued in connection with Italian Application No. IT202200000167 and dated Jul. 26, 2022 (9 pages).

* cited by examiner

DEVICE FOR THE COMPRESSION OF LASER PULSES OF THE ORDER OF THE NANOSECOND AND CONSEQUENT GENERATION OF ULTRASHORT PULSES OF THE ORDER OF ONE HUNDRED FEMTOSECONDS

CROSS-REFERENCE TO RELATED APPLICATIONS

This patent application claims priority from Italian patent application no. 102022000000167 filed on Jan. 7, 2022, the entire disclosure of which is incorporated herein by reference.

TECHNICAL FIELD

The invention relates to a device for the compression of laser pulses of the order of the nanosecond (from some hundreds of picoseconds to some nanoseconds) into ultrashort pulses of the order of 100 femtoseconds (from some tens to some hundreds of femtoseconds).

BACKGROUND OF THE INVENTION

In order to obtain ultrashort laser pulses of the order of one hundred femtoseconds (1 fs=$10^{-15}$ s), several architectures are available, normally based on mode-locking operation, in solid state technology or in optical fibre. An architecture like the one shown in FIG. 1 recently established itself.

FIG. 1 discloses the state of the art and shows an example of laser oscillator used to create said ultrashort pulses.

The oscillator comprises a waveguide arranged between two reflectors (1 and 8) and includes two non-overlapping transmission band-pass filter SF1 and SF2 (2 and 7), optically transparent means with non-linear coefficient $\chi^{(3)}$ different from zero (4,6) configured to achieve a spectral broadening by self-phase modulation of the signal transiting through these means (4,6) and an optical amplifier (5) producing a positive gain.

In the embodiments of the state of the art, the waveguides are single-mode optical fibres. The output signal is picked up upon reflection of one of the filters (2, 7) or through transmission from one of the two terminal mirrors (if it has reflectivity <100%) or from any other point of the oscillator, whereas the laser oscillation could be induced by the spontaneous emission noise of the amplifier (5) or it could be triggered by injecting an external signal in a point of the oscillator conveniently chosen for the purpose (not necessarily coinciding with the same node used to pick up the output signal). As far as the noise is concerned, it should be meant as optical signal fluctuations within the optical amplifier (5) with positive gain. These fluctuations occur within the gain band of the optical amplifier with positive gain (5) and are generically produced by spontaneous decay processes.

The laser oscillation takes place when there is a stabilization of a circulating pulse, whose overall band broadening produced in a single step by the optically transparent means (4) and (6) and by the optical amplifier (5) is at least equal to the spacing between the filters (2) and (7).

In case of triggering produced with an external excitation signal, the triggering devices that have proved to have the greatest reliability among the solutions suggested so far in literature produce pulses of a few picoseconds or tens of picoseconds and are complex and expensive excitation laser sources.

Once the oscillation starts, if the gain of the optical amplifier remains constant, energy and duration of the circulating pulse remain constant even if the external trigger signal is interrupted. Hence, the oscillator emits a train of pulses that are all the same, with a repetition period equal to the time needed to cover a complete cycle in the oscillator.

According to the prior art, this pulse, of the order of the picosecond, can be compressed to durations of the order of 100 femtoseconds by adding the correct amount of group velocity dispersion.

OBJECT OF THE INVENTION

Manufacturers feel the need to provide ultrashort pulses by means of compression in an oscillator of pulses generated by a very simple and cost-effective laser, from a duration of the order of 1 nanosecond to durations of the order of 100 femtoseconds.

The aforesaid object is reached by the device for the compression of pulses of the type described in claim 1.

BRIEF DESCRIPTION OF THE DRAWINGS

The invention will now be described with reference to the accompanying drawings, which show a non-limiting embodiments thereof, wherein.

PREFERRED EMBODIMENT

Figure 1:
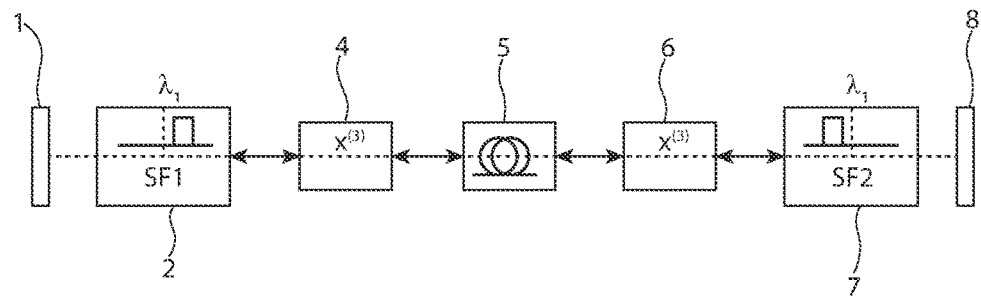
FIG. 1 shows an example of a device for the generation of ultrashort laser pulses according to the prior art.
Figure 2:
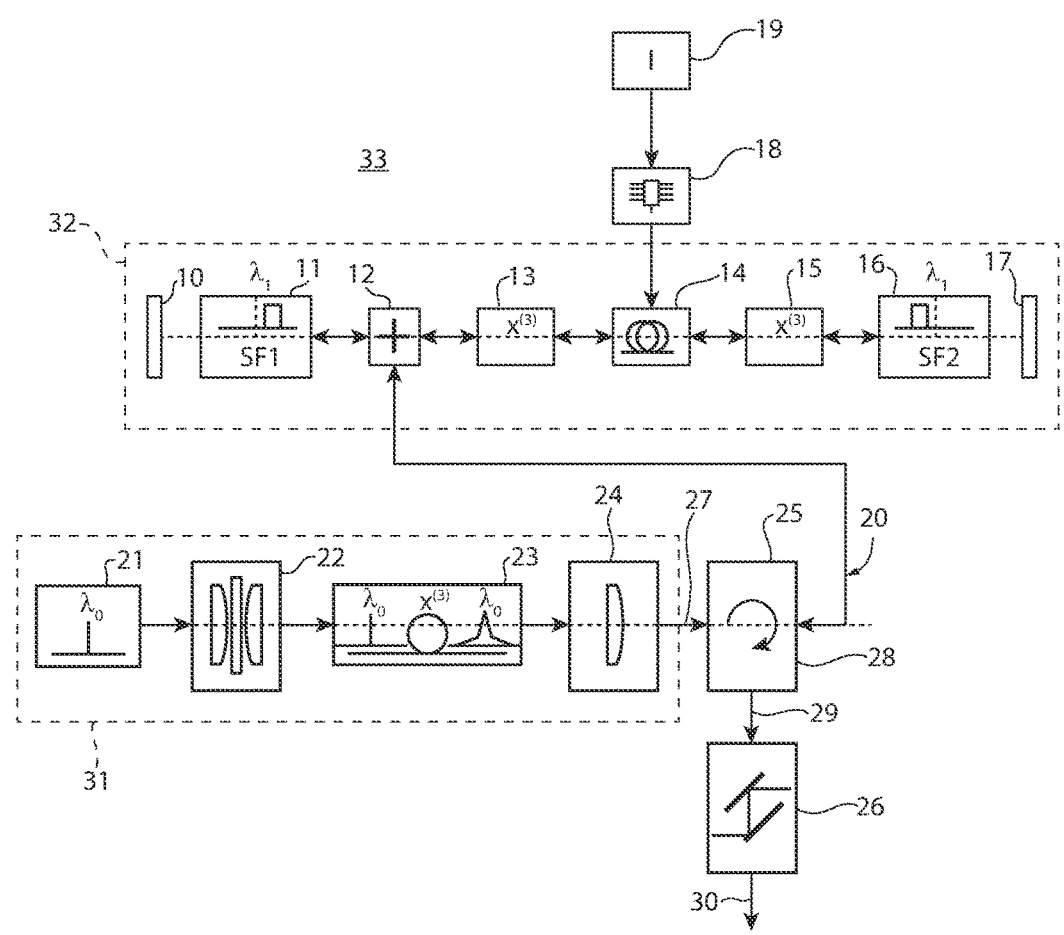
FIG. 2 shows the device for the compression of laser pulses of the order of the nanoseconds into ultrashort pulses of the order of one hundred femtoseconds according to the invention.

FIG. 2 shows a device for the compression of laser pulses of the order of the nanoseconds into ultrashort pulses of the order of one hundred femtoseconds according to the invention. Ultrashort laser pulses are laser pulses having a duration of the order of one hundred femtoseconds.

The device of FIG. 2 comprises an oscillator 32, which is formed by:

terminal optical reflectors 10 and 17;

a first and a second non-overlapping transmission band-pass filter 11 and 16, which are respectively coupled to the terminal optical reflectors 10 and 17;

optically transparent devices 13, 15 with non-linear Kerr coefficient $\chi^{(3)}$ different from zero configured to achieve a spectral broadening by self-phase modulation of the signal transiting through these devices;

an active waveguide (for example, an optical fiber) 14, which produces a positive gain, when illuminated with known technologies by a pump laser diode 18 driven by a suitable current generator 19 also operating with known technologies;

a node 12 configured to receive a trigger signal designed to activate a laser oscillation in the oscillator 32; (the node 12, in the explaining example, is arranged between the band-pass filter 11 and the optically transparent device 13—the node 12 can anyway be arranged in any position between the terminal optical reflectors 10 and 17, based on practical needs).

The device of FIG. 2 further comprises a trigger signal generating device 31.

In the example shown herein, the terminal optical reflectors 10 and 17 and the first and the second band-pass filter 11 and 16, respectively, are realized in form of distinct components; however, the terminal optical reflector 10 and the respective band-pass filter 11 could be integrated in one single component, just like the terminal optical reflector 17 and the respective band-pass filter 16 could be integrated in one single component.

A coefficient $\chi^{(3)}$ corresponding to a non-linear Kerr index $n_2$ equal, for example, to circa $3\times10^{-16}$ cm$^2$/W typical for a telecom optical fibre is sufficient to obtain an adequate spectral broadening by self-phase modulation, however special fibres or waveguides with high non-linearity can usefully be used either to produce shorter pulses or to create oscillators with a high repetition rate (>1 GHz) totally integrated in waveguide on optical chip.

The non-overlapping transmission band-pass filters 11 and 16 are based on known operating principles. To this regard, several possible alternatives are available, all with a comparable effectiveness, such as thin glass plates with suitable dielectric coatings, surface or volume diffraction gratings laid on glass plates or obtained inside optical fibres.

The optically transparent devices 13, 15 with non-linear coefficient $\chi^{(3)}$ different from zero are typically obtained from single-mode optical fibres. Actually, any optically transparent material with $\chi^{(3)}$ different from zero, if properly sized, could serve as non-linear means through which to obtain spectral broadening by self-phase modulation and four-wave mixing. However, waveguides such as optical fibres are particularly effective to this regard, thanks to the possibility of confining the optical radiation within them over arbitrarily long distances, thanks to the principle of total internal reflection. Among the possible optical fibers, intrinsically single-mode fibers, for they ensure a propagation within a smaller core, easily allow for the achievement of levels of higher optical intensity, optimizing the triggering of non-linear phenomena.

The active waveguide 14, which is doped with active ions of rare earth elements, such as for example ytterbium, neodymium, erbium or thulium, though not in a limiting manner, when properly pumped (namely, under conditions of positive gain through absorption of electromagnetic radiation at a wavelength corresponding to one of the peaks of the respective absorption spectrum, as generated by the device 18) leads to the creation of an optical amplifier and is structurally compatible with the optically transparent devices 13, 15 of the passive kind used to trigger non-linear optical phenomena. In the specific case of the created prototype, which operates at the wavelength of 1064 nm, an optical fibre doped with ytterbium ions was used. The requested concentration of dopant is not a parameter deemed to be relevant for the final operation. Assuming that systems operating at different wavelengths have to be created, the dopant of the active fibre must be changed accordingly, as known in literature. The active single-mode optical fibre used in the example discussed herein typically has a length of circa 1 m.

According to the invention, the trigger signal generating device 31 comprises:

a microchip laser source 21 configured to generate a laser pulse preferably having a duration of the order of the nanosecond and with a minimum bandwidth (Fourier limit) approximately equal to the inverse of the time duration;

an optical system 22 (schematically represented by a set of lenses) designed to couple the pulse of laser 21 to the input of a waveguide 23 made of an optically transparent material characterised by a non-linear Kerr coefficient $\chi^{(3)}$ different from zero. Said means made of an optically transparent material could generically be similar to the one used in the optically transparent devices 13 and 15, barring a sizing optimized based on the extent of the desired non-linear effects, without limits set, in the devices 13 and 15, by repetition frequency and energy of the circulating pulses.

The waveguide 23 triggers two distinct non-linear effects in order to spectrally broaden the input pulse of laser 21 and precisely:

a) self-phase modulation (SPM); and
b) four-wave mixing (FWM);

Four-wave mixing (FWM) has a prevailing role over self-phase modulation (SPM) in producing a spectral broadening in this case.

The output of the waveguide 23 supplies the trigger signal to the node 12 through a coupling device 24.

The waveguide 23 is typically made of a single-mode optical fibre.

In particular, in the prototype created by the Applicant, the single-mode optical fibre has a length ranging from 5 to 15 m.

The laser source 21 preferably has a peak power of the emitted pulses exceeding 100 W.

The laser source 21 typically is realized in form of a microchip laser.

The laser 21 conveniently operates in Q-switching mode, which indicates a special operating mode of a laser oscillator of the known kind, with which the laser can produce a pulsed output beam. This technique allows for the production of light pulses with an extremely high peak power, much higher than the one that would be produced by the same laser, if operated in continuous mode. In Q-switching mode, an amplifier is in a state of high gain, while a suited modulator quickly switches cavity losses (Q factor) from a high value (which prevents laser oscillation) to a low value, thus allowing for the oscillation in the form of emission of a single, very intense optical pulse. An active modulator is an electronic component, whereas a passive modulator is a more simple element made of a partially transparent material, whose optical absorption decreases depending on the incident light intensity. Compared to other possible injectors of excitation signals, this source offers advantages in terms of compactness, sturdiness, reliability and low costs. The injection is only needed for triggering the oscillations and can completely be disabled once a stable operation at the output of the device (33) is obtained.

For example, in the prototype created for the invention, the injection involves the use of a microchip laser (a monolithic laser consisting of one single crystal with dielectric mirrors, which simultaneously serves as active means and saturable absorber) operated at the wavelength of 1064 nm, in passive Q-switching mode, with pulse durations of 300 ps, at the repetition frequency of 50 kHz. The laser remains turned on only for the time needed to produce some pulses, which significantly simplifies its power supply. This is a non-limiting example.

A possible alternative entails a simple solid-state laser with discrete elements, which includes a gain element, such as an active crystalline material or an active waveguide or an active fibre, and a modulation element, so that they can allow for the operation in Q-switching mode when properly pumped by a laser diode.

Another alternative is a semiconductor laser diode controlled by means of current pulses having a duration of the order of the nanosecond and amplified, for example, through optical fibre technology.

However, these alternatives could imply higher costs and a greater manufacturing complexity compared to the microchip laser with passive Q-switching.

Self-phase modulation (SPM) (https://it.qiq.wiki/wiki/Self_phase_modulation) is a non-linear optical effect of light-matter interaction. An intense pulse of light, when travelling in a medium, will induce a temporal modulation of the refractive index of the medium due to the optical Kerr effect. This variation in refractive index will produce a phase modulation of the optical pulse, leading to the pulse's spectrum broadening.

Four-wave mixing (FWM) (https://it.qiq.wiki/wiki/Four-_wave_mixing) is an intermodulation phenomenon in non-linear optics, whereby, given three optical frequencies $f_1$, $f_2$ and $f_3$, a fourth one can be generated based on the condition $f_1+f_2=f_3+f_4$, which arises from conservation of energy. In the "degenerate" case, two photons at frequency $f_1$ (intense field or "pump") and a photon at $f_3$ (weak field or "signal") are sufficient, provided that $f_2=f_1$, generating $f_4=2 \cdot f_1-f_3$. In the specific case, since $f_1$ and $f_3$ are two different frequencies ($f_3$ can arise from a spontaneous emission in the optical amplifier, but also from vacuum quantum fluctuations, in the absence of something else), $f_4$ is a new generated frequency, producing a symmetrical spectral broadening ($f_4-f_1=f_1-f_3$).

The output signal of the waveguide 23 (FIG. 3) is spectrally broadened and comprises an amplitude peak comparable with the one of the original signal generated by the laser 21 and a bell-shaped base (pedestal) that contains an amount of energy sufficient to create an oscillation in the oscillator 32.

Figure 3:
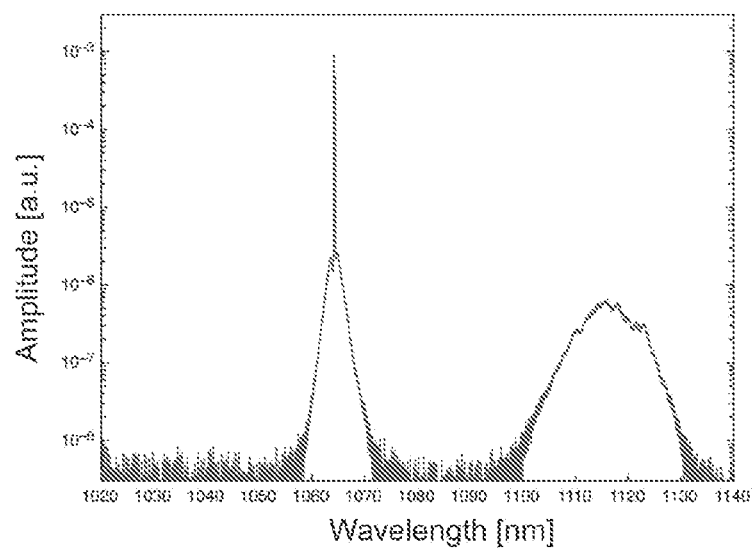
FIG. 3 shows the spectrum of a band broadened signal according to the invention, for triggering the oscillation of the device of FIG. 2.

FIG. 3 shows the spectrum of the signal, namely its representation in wavelength (inversely proportional to the optical frequency).

The vertical scale of FIG. 3 is a logarithmic scale in order to point out possible pedestals in the spectrum, namely spectral broadenings having amplitudes some orders of magnitude below the central peak.

The spectrum of the signal generated by the starting laser source (microchip with passive Q-switching) has a bandwidth <0.1 nm, whereby it is represented by a very narrow line in FIG. 3. The FWM phenomenon produces a central bell under the central peak and the Raman effect produces a further lateral bell, on the right of the central one, which is not essential for the operation of the oscillator 32.

Based on the experimental data of the Applicant, this signal obtains the effect of a systematic and reliable triggering of the oscillation. The spectral width of some nanometres of the bell produced through FWM in the waveguide 23 by the trigger device 31 supports noise fluctuations with a short duration (hundreds of fs) and energy typically <1 nJ, enough to produce a band broadening through SPM suited to establish the operation of the oscillator 32. Band broadening through SPM and FWM progress simultaneously, though FWM fluctuations play a decisive role.

Indeed, the bandwidth produced through SPM is proportional to the peak power of the pulse and inversely proportional to its duration.

In practice, the microchip source (in the example) has a pulse that is too long to trigger a sufficient SPM: according to the invention, the pulse generated by said source also produces a relatively broad FWM spectrum, which corresponds to a short intensity fluctuation with little energy, but a peak power and a duration that are sufficient to support the band requested for triggering of the oscillation and for the consequent generation of stable pulses that can be reduced to circa 100 femtoseconds at the output of the oscillator, through compensation of the dispersion with known techniques.

For example, if a 10 m long single mode optical fibre is used as waveguide 23, with minimum bandwidth (Fourier limited) pulses of 300 ps, in order to produce a pedestal of some nanometres through FWM, a pulse energy of the order of 100 nJ is needed. The optimal length of the waveguide 23 depends on the duration and on the energy of the pulse provided by the device 21 and on the non-linear Kerr coefficient $\chi^{(3)}$ of 23.

An optical circulator or rotator 25 is interposed between the node 12 and the coupling device 24 in order to separate the output signal from the trigger signal generated by the device 31. In this way, the optical circulator or rotator 25 is configured to allow for the transit of the trigger signal from the trigger signal generating device 31 to the node (12) and of the output signal produced by the oscillator 32 from a first port 28 connected to the node 12 to a second port 29 that serves as an output. For example, a rotator based on Faraday effect can be used, which allows for a one-way propagation from a third port 27 to the first port 28 (injection path of the trigger signal 20) and from the first port 28 to the second port 29 (extraction path). Alternatively, the output of the oscillator 32 can be picked up by a distinct node from the injection one 12. The pulses available at the second port 29 of the circulator or rotator 25 normally have a duration of some picoseconds and can be further compressed to the final duration (of the order of 100 femtoseconds) through the use of a common dispersive device 26, which uses diffraction gratings (if necessary, realized in an optical fibre) or any other material capable of providing dispersion of the group velocity in a suitable quantity and sign. The circulator or rotator 25 normally also fulfils a protective optical isolation function for the trigger device 31. The dispersive device 26 is provided with an output 30, where the ultrashort pulses can be picked up. The dispersive device 26 could also be configured to compress the pulses made available by any output of the oscillator 32, that does not go through the circulator or rotator 25, to a final duration of the order of 100 femtoseconds.

Variants of the embodiments described above are possible.

Figure 4:
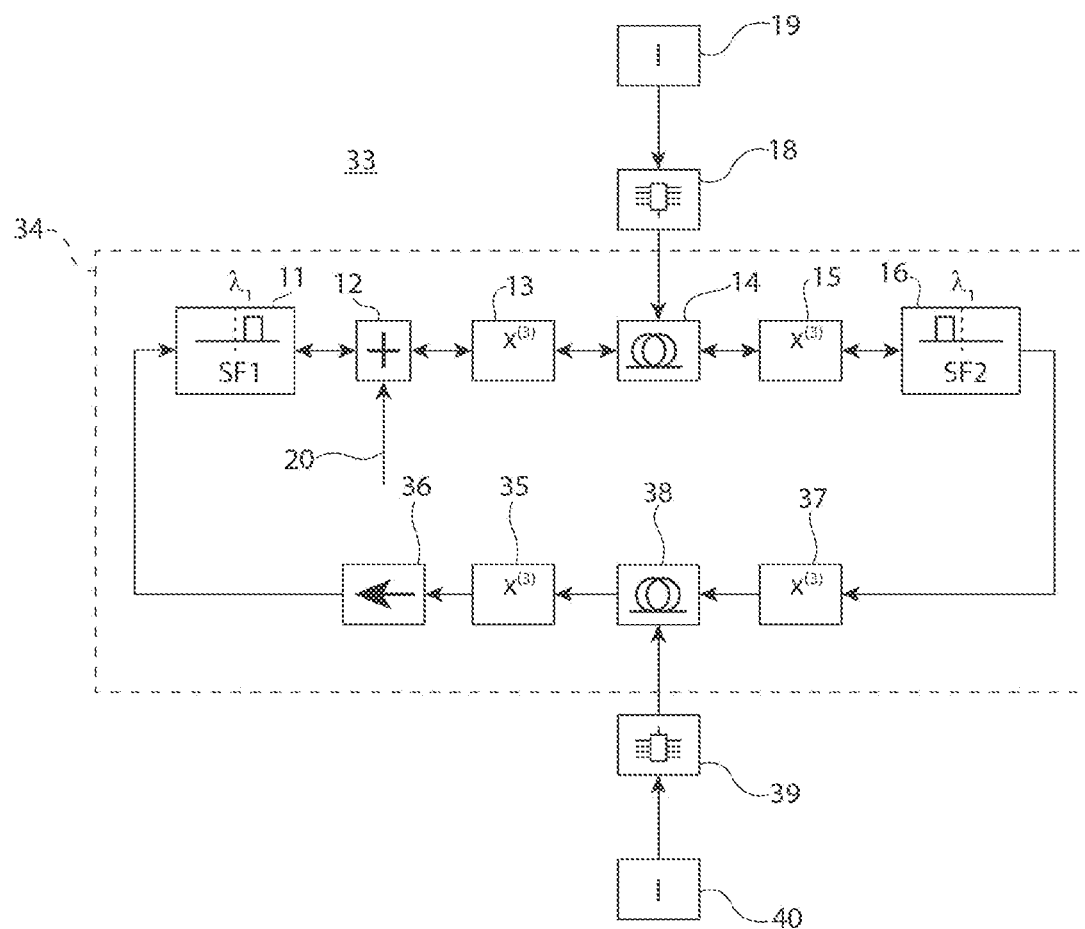
FIG. 4 shows an alternative, more complex, though equally valid solution for the oscillator shown in FIG. 2, based on a ring-like structure.

FIG. 4 shows a variant in which the oscillator comprises a ring path, which entails:
  a first and a second non-overlapping transmission bandpass filter 11 and 16;
  optically transparent devices 13,15 with non-linear Kerr coefficient $\chi(3)$ different from zero arranged between the band-pass filters 11 and 16 and configured to achieve a spectral broadening by self-phase modulation of the signal transiting through these devices 13,15;
  an active optical waveguide 14 arranged between the optically transparent devices 13, 15 and producing a positive gain;
  a node 12 configured to receive a trigger signal designed to establish the operation of the oscillator 34 (the node 12 can be arranged in any position of the ring path);
  further optically transparent non-linear devices 35, 37 with non-linear Kerr coefficient $\chi(3)$ different from zero;

an isolator 36 configured for a specific direction of propagation of the light radiation (indicated with the arrow) arranged in any point within the ring path;

a second optical amplifier 38, similar but not necessarily identical to the amplifier 14, pumped by a laser diode 39 driven by a current generator 40, arranged between the devices 35 and 37;

a trigger signal generating device 31 of the type described above and comprising:

a laser source 21, configured to generate a laser pulse having a duration of the order of the nanosecond, which is required to trigger the oscillator 34 with a duration of the order of the nanosecond;

a coupling system 22 designed to introduce the laser pulse 21 into a waveguide 23 made of an optically transparent material characterised by a non-linear Kerr coefficient $\chi^{(3)}$ different from zero, which is configured to achieve two distinct effects in order to spectrally broaden the pulse of the laser (21), and precisely:

a) self-phase modulation (SPM); and
b) four-wave mixing (FWM);

the output of the waveguide 23 supplies the trigger signal to the node 12.

The method for the generation of pulses of the order of 100 femtoseconds starting from pulses of the order of 1 nanosecond preserves its validity if the oscillator 32 is replaced by the ring oscillator described above with reference to FIG. 4. This configuration implies the absence of the terminal reflectors 10 and 17 and the connection of the filters 11 and 16 by means of the optically transparent non-linear means 35 and 37, with the addition of the isolator 36, which is useful to set a specific direction of propagation within the ring.

In a particular embodiment which is not shown herein, the optical system 22 and the waveguide 23 can be omitted and the pulse of the laser 21 can be directly coupled in the oscillator, for example to the node 12, provided that the optically transparent devices 13, 15 and the active waveguide 14 are sized so as to generate, as a whole, the needed non-linear effects instead of the waveguide 23.

NUMBERS 32 oscillator;
10,17 terminal optical reflectors;
11, 16 first and second non-overlapping transmission band-pass filter;
13, 15 optically transparent devices;
14, 38 active waveguides;
18, 39 pump laser diodes;
19, 40 current generators;
12 node;
31 trigger signal generating device;
20 injection path;
21 microchip laser source;
22 optical system;
23 waveguide;
24 coupling device;
25 optical circulator or rotator;
28 first port;
29 second port;
27 third port;
26 dispersive device;
30 output of the dispersive device 26, where the pulses of the order of one hundred femtoseconds are made available;
35, 37 further non-linear optically transparent devices

The invention claimed is:

1. A device for the compression of laser pulses of the order of the nanosecond and consequent generation of ultrashort pulses down to durations of the order of 100 femtoseconds comprising an oscillator, formed by:

reflective end elements of the oscillator;
a first and a second non-overlapping transmission band-pass filter;
optically transparent means with non-linear Kerr coefficient $\chi(3)$ different from zero configured to achieve a spectral broadening by self-phase modulation of the signal transiting through these means;
an active optical waveguide that produces a positive gain;
a node configured to receive a trigger signal designed to establish the operation of the oscillator;
a trigger signal generating device, characterised in that the trigger signal generating device comprises:
a laser source, configured to generate a laser pulse having a duration of the order of the nanosecond, which is required to trigger the oscillator;
a coupling system designed to introduce the laser pulse into a waveguide made of an optically transparent material characterised by a non-linear Kerr coefficient $\chi(3)$ different from zero, which is configured to produce two distinct effects in order to spectrally broaden the pulse generated by the laser source, and precisely:
a) self-phase modulation; and
b) four-wave mixing;
the output of the waveguide supplying the trigger signal to said node.

2. The device according to claim 1, wherein at least one of the reflecting end elements of the oscillator incorporates the function of the corresponding band-pass filter.

3. The device according to claim 1, wherein the reflecting end elements of the oscillator are made from components distinct from the first and second non-overlapping transmission band-pass filters.

4. The device according to claim 1, wherein the active waveguide is made by an optical fibre illuminated by a pump laser diode driven by a current generator.

5. The device according to claim 1, wherein an optical circulator or rotator is interposed between said node and the trigger signal generating device, to separate the output signal of the oscillator from the trigger signal generated by the device; said optical circulator or rotator is configured to allow the transit of the trigger signal from the trigger signal generating device to said node and of the output signal produced by the oscillator from a first port connected with the node to a second port that acts as an output.

6. The device according to claim 5, wherein the second port is connected with a dispersive device configured to compress the pulses available at the second port of the circulator or rotator to a final duration of the order of 100 femtoseconds.

7. The device according to claim 1, wherein a dispersive device is configured to compress the available pulses from any one output of the oscillator to a final duration of the order of 100 femtoseconds.

8. The device according to claim 1, wherein said waveguide is made from a single-mode optical fibre.

9. The device according to claim 8, wherein the single-mode optical fibre has a length comprised between 5 and 15 m.

10. The device according to claim 1, wherein the waveguide has a non-linear Kerr coefficient $\chi(3)$ associated with a nonlinear refractive index $n_2 > 2 \times 10^{-16}$ cm$^2$/W.

11. The device according to claim 1, wherein said laser source is configured to generate a laser pulse having a duration of the order of the nanosecond and a minimum bandwidth defined by the Fourier limit equal to approximately the inverse of its time duration.

12. The device according to claim 1, wherein said laser source is made from a microchip laser.

13. The device according to claim 1, wherein said laser source operates in Q-switching mode.

14. The device according to claim 1, wherein the laser source has a peak power greater than 100 W.

15. A device for the compression of laser pulses of the order of the nanosecond into ultrashort pulses down to durations of the order of 100 femtoseconds wherein the oscillator is provided with a ring path in which the following are provided:

a first and a second non-overlapping transmission bandpass filter; optically transparent means with non-linear Kerr coefficient $\chi(3)$ different from zero configured to achieve a spectral broadening by self-phase modulation of the signal transiting through these means; an active optical waveguide that produces a positive gain; a node configured to receive a trigger signal designed to establish the operation of the oscillator; further optically transparent non-linear means with non-linear Kerr coefficient $\chi(3)$ different from zero; an isolator arranged at any one position along the ring path, configured for a specific direction of propagation of the light radiation within the ring path; a second optical amplifier placed between the further optically transparent non-linear means; a trigger signal generating device, which is characterised by comprising: a laser source, configured to generate a laser pulse having a duration of the order of the nanosecond, which is required to trigger the oscillator; a coupling system designed to introduce the laser pulse into a waveguide made of an optically transparent material characterised by a non-linear Kerr coefficient $\chi^{(3)}$ different from zero, which is configured to achieve two distinct effects in order to spectrally broaden the pulse of the trigger laser, and precisely: a) self-phase modulation; and b) four-wave mixing; the output of the waveguide supplying the trigger signal to said node.

* * * * *